May 3, 1960

W. H. DREBING 2,935,116

BONDING APPARATUS

Filed March 24, 1958

INVENTOR.
WARREN H. DREBING

BY

ATTORNEY

May 3, 1960 W. H. DREBING 2,935,116
BONDING APPARATUS
Filed March 24, 1958 3 Sheets-Sheet 2
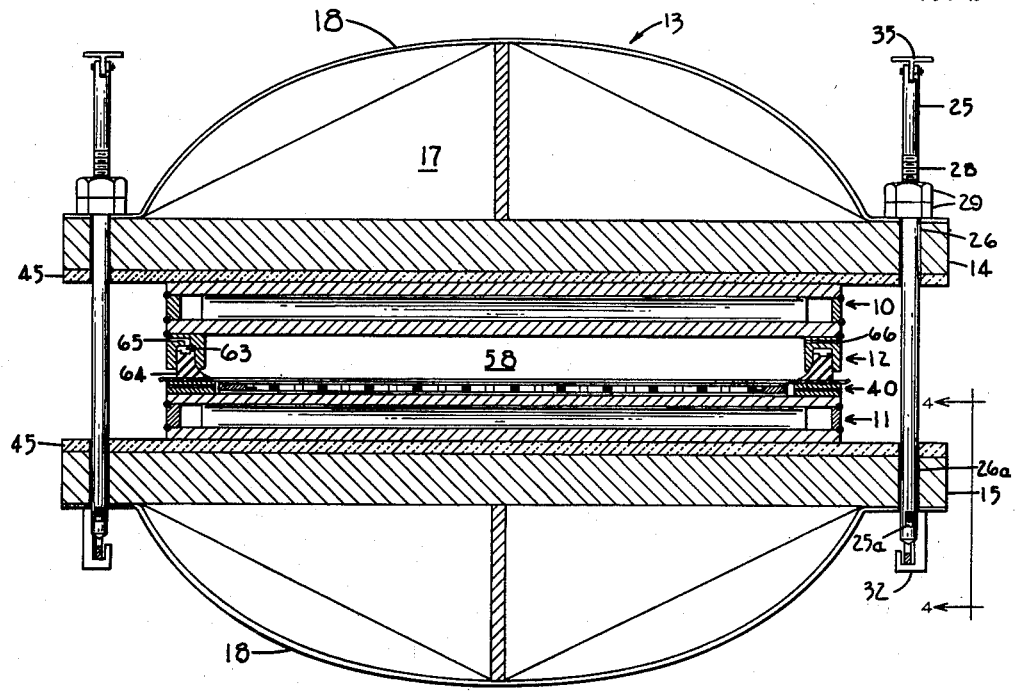
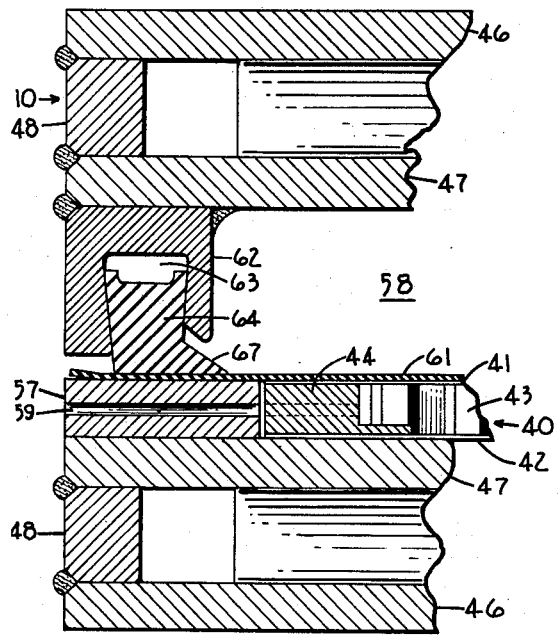
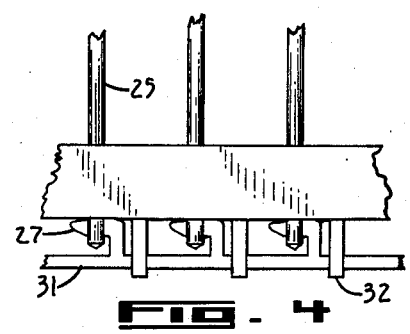
INVENTOR.
WARREN H. DREBING
BY
ATTORNEY May 3, 1960 W. H. DREBING 2,935,116
BONDING APPARATUS
Filed March 24, 1958 3 Sheets-Sheet 3
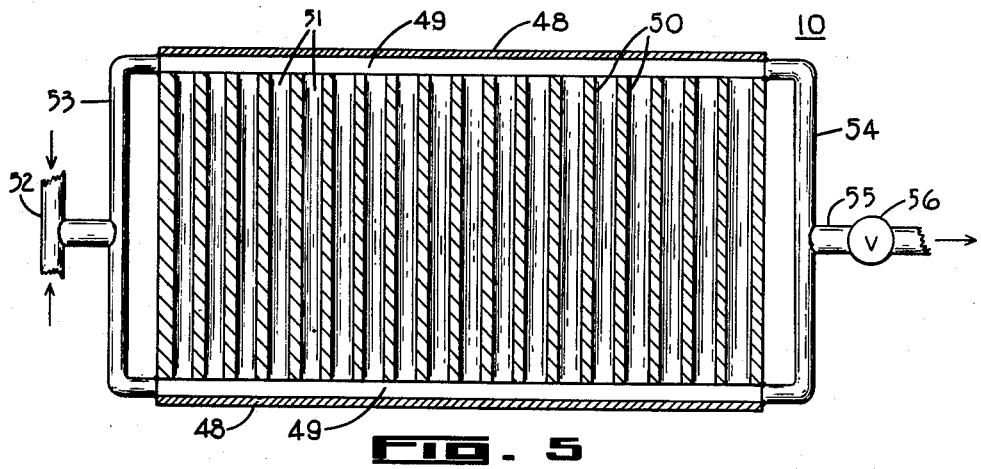
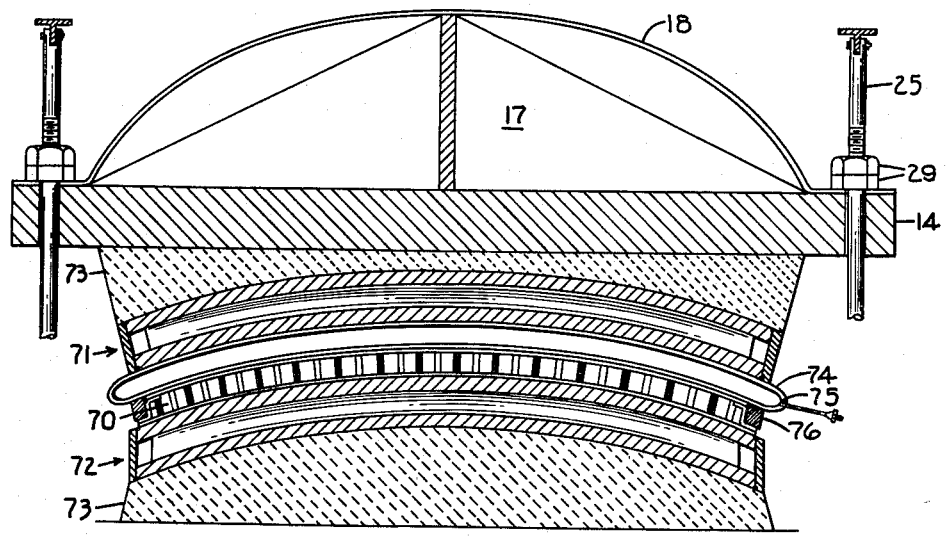
INVENTOR.
WARREN H. DREBING
BY
ATTORNEY United States Patent Office 2,935,116
Patented May 3, 1960

2,935,116

BONDING APPARATUS

Warren H. Drebing, Fort Worth, Tex., assignor to General Dynamics Corporation, San Diego, Calif., a corporation of Delaware Application March 24, 1958, Serial No. 723,537

8 Claims. (Cl. 154—1)

The present invention relates to an improved apparatus for bonding metal to metal through the medium of pressure/heat sensitive bonding materials.

Structural members employed in present day aircraft and missiles are subjected to severe and varying stresses and must necessarily exhibit structural integrity of a very high order before they can be accepted for such use. Consequently, all adhesive bonds between component elements of such members must necessarily be of such excellent character that they will have the capability of resisting or withstanding stress loads of varying magnitude, while simultaneously being subjected to extremes of hot or cold environments. Pressure/heat sensitive structural adhesives are commercially available which under uniform heat and pressure properly applied will afford the desired quality bond. Since adhesives of the type that will produce the quality bond desired require a curing pressure which is relatively high (for best results an adhesive may require a pressure at about 125 to 175 p.s.i.), there is a necessity for relatively inexpensive apparatus which can safely, efficiently and economically apply a controlled, even heat while simultaneously imparting a uniform, controlled pressure. Such heat and pressure must be maintained at a given level necessary to produce a satisfactory bond under mass production conditions.

Conventional devices usually employed for attaining a bond between integral parts of a typical structural cellular cored composite sandwich assembly, with pressure/heat sensitive structural adhesives as the bonding medium, include various types of vacuum presses and commercial industrial autoclaves. Since the pressure developed with a vacuum can never exceed atmospheric pressure, it should be evident that this type apparatus is much too limited to be practical for present day bonding needs, where required bonding pressures may be 125 p.s.i. and above.

The usual autoclave, the most successful conventional high pressure bonding device, has many disadvantages which render it very undesirable for production bonding. The large quantity of compressed air required to bond a composite panel assembly 21' x 7' x 0.3' for example, in a cylindrical autoclave capable of holding said assembly is obviously a safety hazard and the time required to heat and cool such a fixture and its encapsuled atmosphere is very excessive. Since it is necessary to maintain pressure on the object assembly being bonded until it is relatively cool (this to prevent warping of said assembly beyond tolerable limits related to modern aircraft), the fixture must cool also each time a part is bonded. This causes a definite interruption in production since the normal cooling period for a massive autoclave of the aforementioned size and character is often from twelve to sixteen hours. It has also been found that combustion sometimes occurs inside the industrial autoclave while in use, thus destroying any workpieces being bonded and rendering the autoclave inoperative while the damage is being repaired.

Other operational disadvantages reside in the immobility of industrial autoclaves of this type and in the excessive amount of productive floor area required to accommodate them. Further, conventional autoclave tooling has no adequate provision to permit escapement of volatile gases given off by the adhesives while they are being cured. Often these trapped gases cause adhesion voids.

As distinguished from commercial autoclaves, employed as the aforementioned conventional means for applying heat and pressure to an assembly for the purpose of curing a bonding medium, the present invention contemplates a relatively inexpensive, small, and semi-portable pressure restraining apparatus with simple and efficient means for applying uniform and controlled heat and pressure (in a relatively large range) in a manner that is safe, economical and easy to adapt to mass production. Further, it will effect a superior quality bond between components in which pressure/heat sensitive structural adhesives are employed.

The primary object of the present invention is to provide an improved form of apparatus whereby structural components may be bonded together (using pressure/heat sensitive adhesives as a bonding medium), the apparatus permitting the application of controlled heat and pressure in a manner which adapts the apparatus to mass production.

Another object of the present invention is to provide an apparatus of the above class and character which is capable of developing relatively high pressure and controlled heat and safely applying such pressure and heat to a workpiece.

Yet another object resides in the provision of an improved apparatus for adhesively bonding together components of a structural assembly which automatically cools the workpiece, under pressure, after the required curing period, thereby effecting a reduction in the time required for the bonding cycle.

Another object is to provide an apparatus of the above class and character that embodies a simple means for escapement of air and volatile gases from the assembly being bonded.

A still further object of the invention is to provide an apparatus of the above class and character that can be easily and economically fabricated; is not affected by heat or thermal shock; will retain its accuracy and precision under normal working conditions; will require only a minimum amount of maintenance; and is easy and economical to use.

Other objects and features of the present invention will be readily apparent to those skilled in the art from the following specification and appended drawings wherein is illustrated a preferred form of the invention, and in which:

Figure 2 is a transverse sectional view of the fixture of Figure 1 but here there is also shown temperature and pressure imparting means in accordance with the present invention in place in the holding fixture and in position to cure adhesive to effect an integral bond in a typical flat aircraft sandwich panel construction.

Figure 3 is an enlarged partial detail view of an edge section of the temperature and pressure imparting means of Figure 2.

Figure 4 is a partial detailed view of a section of the quick action locking device employed with the restraining fixture of Figures 1 and 2.

Figure 1:
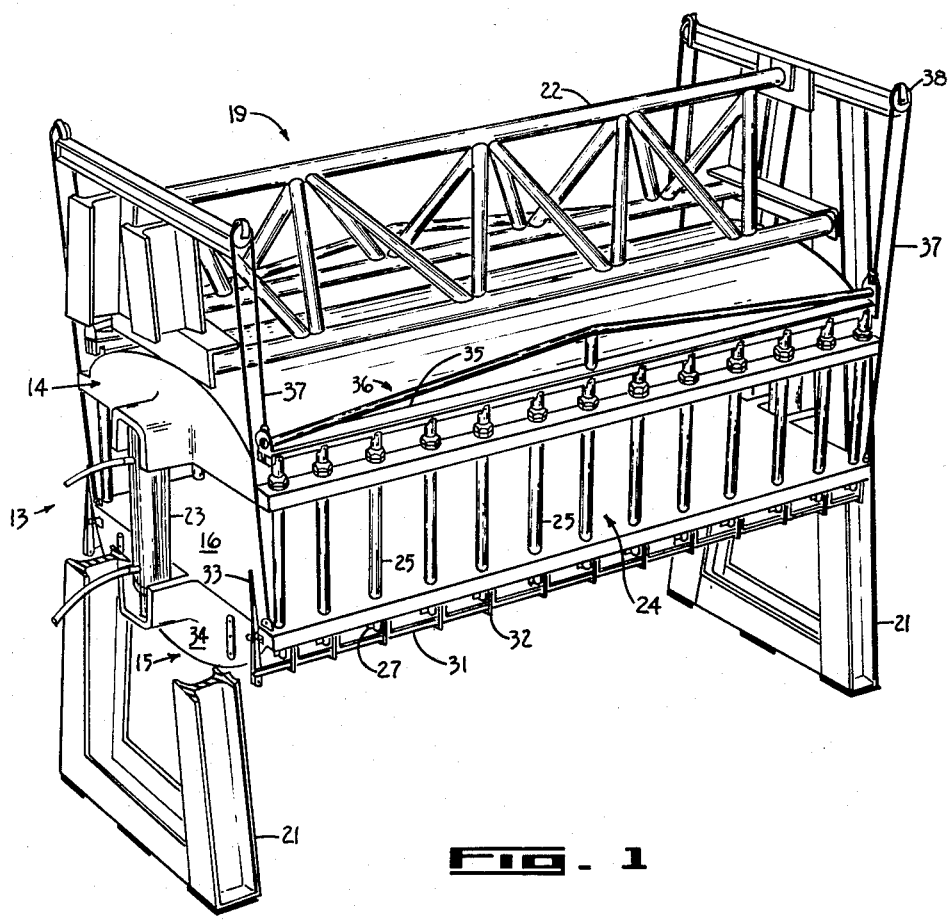
Figure 1 is a perspective view with portions cut away for clarity, illustrating a holding fixture for use with the present invention.

Figure 5 is a sectional view through a temperature imparting means of Figure 2 showing the flow pattern for a temperature controlling medium (in this case steam or water); and Figure 6 is a sectional view illustrating an alternate form of means for applying pressure and a curved form of the preferred temperature imparting means as they are employed to cure adhesive, thereby effecting a bond between the component parts in a typical curved sandwich panel.

Having reference in detail to the drawings, and more particularly to Figures 2 and 3, the pressure/heat inducing bonding apparatus contemplated by the present invention comprises a pair of spaced apart temperature imparting platens, indicated generally by the numerals 10 and 11, and a force applying arrangement disposed therebetween which is indicated generally by the numeral 12. Temperature imparting platens 10 and 11 and the force applying arrangement 12 are supported in operative position upon a restraining fixture 13 which is shown in Figures 1 and 2 and is illustrative of a form of fixture which may be employed with the present invention.

Restraining fixture 13 comprises an upper casting 14 and a lower casting 15 which respectively serve as the "head" and "bed" of the fixture. Castings 14 and 15 are essentially alike in construction and appearance and each is provided with a flat rectangular face 16, which faces, when in mounted position, are disposed in opposition. Head 14 and bed 15 are of relatively heavy construction and are provided with suitable reinforcing ribs 17 to prevent warpage. A fairing 18 is provided on both the head and the bed to enclose the ribbed portions thereof. Head 14 is suitably rigidly affixed, as by bolting or welding, to a supporting frame 19 which comprises spaced leg portions 21 formed of I-beams and an interconnecting truss 22.

Bed 15 is movably supported from head 14 by a pair of actuator means 23, which may be a usual hydraulic or pneumatic piston/cylinder device. The actuator means 23 desirably should be of such size that in its inactive, or piston projected position, the face of bed 15 will be located at approximately table-top height for easy loading.

Figure 1 shows the relative positions of head 14 and bed 15 when the bed 15 has been raised by lift means 23. The temperature imparting platens 10 and 11 and the force applying means 12 which are to be supported between head 14 and bed 15 are not shown in Figure 1 but will be described in connection with Figures 2 and 3.

Restraining fixture 13 includes a locking means, indicated generally by the numeral 24, at each of the sides of the head 14 and bed 15 which serve to maintain the fixed relationship of the head and bed and of the material which may be placed therebetween. Each locking means 24 comprises a plurality of vertically disposed restraining bars 25 which pass through aligned openings 26 and 26a provided respectively in head 14 and bed 15. The lower end of each bar 25 projects below bed 15 and has a through slot 25a therein which is adapted to receive a locking pin 27. That part of each bar 25 which projects above the head 14 has a threaded portion 28 which carries adjusting and locking nuts 29. When head 14 and bed 15 are in their working positions, with a part to be worked therebetween, as shown in Figure 2, the nuts 29 on each restraining bar 25 are tightened so that the tops of the various locking pins 27 projecting through the lower ends of the bars are made snug with the bottom surface of the bed 15. As best shown in Figures 1 and 4, the locking pins 27 at each side of the fixture are all carried by a common rod 31 and may be formed integral therewith. Rod 31 is slidably supported from bed 15 by cradles 32 and is actuatable to move all of the locking pins 27 in unison by a lever 33 which is suitably pivotably mounted at the end face 34 of bed 15.

The bars 25 grouped at each side of the fixture are also adapted to move in unison. As is shown in Figures 1 and 2 the uppermost ends of the bars 25 along a side of the fixture are each suitably connected, as by a pin, to the vertical leg of an elongated T-bar 35, which T-bar 35 forms a part of a truss 36. To each end of truss 36 there is connected one end of a cable 37 which extends upwardly and to run over a usual pulley 38 suitably carried by frame 19 and downwardly for attachment of its other end to a suitable bracket on the bed 15. It is apparent that when bed 15 is released from pins 27 and is moved downwardly from its position of Figure 1 to the desired table-top height above the floor cables 37 will transmit the pull of bed 15 to each end of truss 36 to raise it. This upward movement of truss 36 will carry with it all of the bars 25 connected to it to withdraw the lower ends of the bars 25 from bed 15 and space them above the bed and thus provide clearance for a workman to load the bed.

The heating platens 10 and 11 and the force applying means 12 are illustrated in Figures 2 and 3 in connection with the assembled components of a typical composite flat structural panel 40. Panel 40 comprises an inner skin panel 41 and an outer skin panel 42 separated by a metallic honeycomb-like cellular core material 43 and also embodying peripheral edge members 44. These various components are to be adhesively bonded together under pressure and heat into a fixed unit by means of a suitable metal bonding adhesive, which is disposed between the faying surfaces of the individual components, and which adhesive may be provided in brushed-on form as a layer of material or in conventional type form. The particular composition of the adhesive used, it is understood, forms no part of the present invention as it is contemplated that any suitable commercially available adhesive may be employed.

It is understood that the structural panel 40 of Figures 2 and 3 is merely illustrative of the type of metal bonded sandwich-type panels which may be worked with the present invention. The panel may be flat or curved and of various sizes and outline configurations.

The present invention is illustrated in Figures 2 and 3 in connection with a flat form of structural panel and accordingly, the various components of the bonding apparatus are shaped to accommodate a flat panel.

As shown, heating platen 10 is carried by head 14 and heating platen 11 is supported on bed 15 being fixedly attached in place by any suitable means and thermally insulated from such platens by a layer of suitable insulating material 45. Platens 10 and 11 are of the same construction, each comprising a base plate 46 and a top plate 47 which are spaced apart by longitudinal edge members 48, these edge members being rigidly affixed in place as by welding. Disposed between plates 46 and 47, as shown in Figure 5, are a plurality of transverse wall members 50 suitably rigidly affixed in position. The lengths of wall members 48 are less than the widths of plates 46 and 47 so that longitudinally extending cavities or passages 49 are provided adjacent the longitudinal edges of the platen. As shown, these longitudinal cavities are interconnected by a plurality of transversely extending cavities or passages 51 defined by the transverse walls 50. Forming integral manifold fluid passages internally of the platens 10 and 11, as described, for the flow of the calefacient or coolant fluid medium will achieve a substantially uniform rate of heating or cooling of the platens' working surfaces. The heating medium employed to heat platens 10 and 11 is preferably saturated steam which is obtained from a line 52 connected to a suitable heat source, not shown. Line 52 is connected to a generally U-shaped pipe 53, associated with each platen 10 and 11, the legs of the pipe 53 being attached, in suitable manner, to its platen at the entrances of the longitudinal passages 49 therewithin. When it is desired to cool the platens 10 and 11 the flow of saturated steam is shut off and cold water from a suitable source is fed through pipes 52 and 53 to the platens to circulate through the fluid passages 49 and 51 thereof and effect rapid cooling of the platens and of the composite bonded structure 40 therebetween. Steam condensation and the cooling water exit from platens 10 and 11 through a U-shaped pipe 54 connected to the exit openings of longitudinal passages 49. Pipe 54 connects to a flow line 55 controlled by a usual valve 56. Platens 10 and 11 may be inclined somewhat, if desired, so as to form a sump for the collection of any steam condensation and ease the disposal of this condensation from the platen. Aluminum has been found to be an excellent material for the fabrication of platens 10 and 11 since it effectively withstands the thermal shock induced when cold water is injected into the hot platens in the "cold-to-hot-to-cold" bonding cycle.

The component elements of the structural panel 40 to be worked upon are first formed to their desired planar configuration, then assembled and suitably tack-bonded in a preliminary operation to prevent inadvertent shifting of the components with respect to each other. This assembly is then positioned on platen 11 carried by bed 15. A sealing frame or rail 57 of approximately the same thickness as panel 40 is then placed on lower platen 11 and in completely surrounding relationship to panel 40. Frame 57 may be made of lengths of any suitable flat stock arranged and connected together in an outline conforming to the outline of the panel 40 which it surrounds. Frame 57 serves to facilitate the sealing of a pressure chamber 58, to be described, formed between upper and lower platens 10 and 11 and also serves as a spacer to effect the proper adjustment and positioning of locking means 24 carried by restraining fixture 13. Frame 57 is transversely apertured at 59 at spaced intervals, so that the area in which panel 40 is confined is vented to atmosphere. These apertures provide for the escape of volatiles released during the bonding process.

A flexible resilient blanket or diaphragm 61, formed of a suitable material such as silicone rubber, extends over and covers the composite structure 40, and is of such size that it extends outwardly to overlie sealing frame 57 as well.

After the composite panel 40 has been properly positioned on lower platen 11 with sealing frame 57 and diaphragm 61 in place, bed 15 is raised by actuator means 23 to bring panel 40 into contact with force applying arrangement 12. In this movement of bed 15, restraining bars 25 of the locking means 24 are dropped by cables 37 so that the lower ends of the bars project beneath the bed 15. Nuts 29 are adjusted and lever 33 actuated to move locking pins 27 into slots 26 of the bars 25 to properly adjust and lock bars 25 in place. The present apparatus is now in condition to accept the air pressure necessary to effect the bonding operation without a spreading apart of the head and bed.

The force applying arrangement 12 of the present invention comprises a continuous frame-type seal retainer member 62 which is perimetrically located on the lower surface of platen 10 carried by head 14 so as to oppose sealing frame 57. Retainer member 62 is attached fixedly in an air-tight manner to platen 10. Retainer member 62 is provided with a continuous channel 63 which is shaped to closely receive a continuous flexible and resilient sealing means 64, which may be made of any suitable material, such as silicone rubber, and which, as shown is substantially boot-shaped in cross-section. As shown in Figure 2, retainer member 62 is provided with a plurality of transverse air inlets or ports 65 and 66. Suitable valving mechanisms and connecting lines, not shown, join inlets 65 and 66 to a suitable supply of compressed air, not shown. Air inlets or ports 65 do not extend completely through retainer member 62 but communicate with channel 63 above sealing strip 64 for the purpose of supplying air pressure to the channel to drive or force sealing strip 64 downwardly against diaphragm 61 to effect an airtight seal around the panel 40. With sealing strip 64 in place upon diaphragm 61 there is formed the pressure chamber 58. Air pressure for this pressure chamber 58 is provided through air inlets or ports 66 which pass completely transversely through retainer member 62. The pressure in chamber 58 applies bonding pressure (as in the order of 175 p.s.i.) to the object panel 40 through diaphragm 61 so as to maintain continuous intimate contact between the component elements thereof until bonding is effected. Additionally, the air pressure within chamber 58 acts on the toe portion or angularly disposed flange 67 of the resilient sealing strip 64 to further aid in maintaining a substantially airtight construction. Seal retainer member 62 and sealing strip 64 are preferably constructed as shallow as is practicable to reduce the volume of compressed air, thereby reducing the hazard involved, and to position the working surface of upper platen 10 in close proximity to the panel 40 to be bonded. However, there is efficient heat transfer through chamber 58 since the air pressure attained therein is so great. The use of saturated steam will effectively provide the required temperature which may, for example, be approximately 350° F. (controlled to plus or minus 2° F.). It is understood that heat and pressure is applied to the apparatus for that period of time required by the particular adhesive employed for curing thereof.

Figure 6 illustrates the form of bonding apparatus when a curved composite structure, indicated at 70, is to be worked. Here the upper and lower platens 71 and 72, respectively, are curved to conform to the curve desired for the composite structure 70. It is understood that the construction of platens 71 and 72 is the same as that of platens 10 and 11 above described. Appropriate connections are made to platens 71 and 72 to feed saturated steam thereinto for the bonding operation. Spacer members 73, of appropriate curvature, are carried by head 14 and bed 15 to accommodate and properly support platens 71 and 72.

The pressure applying means of this second embodiment is indicated generally at 74 and comprises a flexible bag-like diaphragm, preferably fabricated of stainless steel sheet. An inlet or port 75 is provided for the introduction of air pressure to diaphragm 74 to provide the necessary bonding pressure. Filler members 76 are provided for the composite structure 70 for supporting faying edges of less thickness than the core of the composite structure and is not an airtight peripheral construction.

As thus described, the invention is exemplified as an improved apparatus for the application of uniform heat and pressure to a composite structure to be bonded together, such as a sandwich panel construction, where such structure must have controlled heat and pressure applied thereto for a predetermined interval of time.

While certain preferred embodiments of the invention have been specifically disclosed it is understood that the invention is not limited thereto as many variations will be readily apparent to those skilled in the art and the invention is to be given its broadest possible interpretation within the terms of the following claims.

What I claim is:

1. Apparatus for fabricating a composite structure formed of component elements adapted to be adhesively bonded together under heat and pressure, said apparatus comprising a pair of heating platens adapted to be positioned and held with their work surfaces in opposed relationship and at opposite sides of said composite structure for transmittal of heat thereto, and means forming a pressure chamber between the work surfaces of one of said platens and a surface of said composite structure, said means comprising a sealing frame peripherally surrounding said composite structure, a flexible cover blanket overlying said composite structure and extending onto said sealing frame, a seal retainer member disposed above said sealing frame and the portion of the sealing blanket thereon and a continuous sealing member of resilient material carried by said seal retainer for sealing engagement with said portion of the sealing blanket, said seal retainer member having inlet openings for the introduction of a pressurized gaseous medium to said pressure chamber for applying force through said blanket to said composite structure in a bonding operation.

2. Apparatus for fabricating a composite structure formed of component elements adapted to be adhesively bonded together under heat and pressure, said apparatus comprising a pair of heating platens adapted to be positioned and held with their work surfaces in opposed relationship and at opposite sides of said composite structure for transmittal of heat thereto, said platens each having passageways therein for flowing a heating medium through the platen, and means forming a pressure chamber between the work surface of one of said platens and a surface of said composite structure, said means comprising a sealing frame peripherally surrounding said composite structure, a flexible cover blanket overlying said composite structure and extending onto said sealing frame, a seal retainer member disposed above said sealing frame and the portion of the sealing blanket thereon and a continuous sealing member of resilient material carried by said seal retainer for sealing engagement with said portion of the sealing blanket, said seal retainer member having inlet openings for the introduction of a pressurized gaseous medium to said pressure chamber for applying force through said blanket to said composite structure in a bonding operation.

3. Apparatus for fabricating a composite structure formed of component elements adapted to be adhesively bonded together under heat and pressure, said apparatus comprising a pair of heating platens adapted to be positioned and held with their work surfaces in opposed relationship and at opposite sides of said composite structure for transmittal of heat thereto, said platens each comprising spaced apart top and base plates and wall members therebetween forming passageways for circuitous flow of a heating medium through the platen, and means forming a pressure chamber between the work surface of one of said platens and a surface of said composite structure, said means comprising a sealing frame peripherally surrounding said composite structure, a flexible cover blanket overlying said composite structure and extending onto said sealing frame to enclose said composite structure, said sealing frame having through apertures therein to permit escape of volatile gases from the area of the enclosed composite structure, a seal retainer member disposed above said sealing frame and the portion of the sealing blanket thereon and a continuous sealing member of resilient material carried by said seal retainer for sealing engagement with said portion of the sealing blanket, said seal retainer member having inlet openings for the introduction of a pressurized gaseous medium to said pressure chamber for applying force through said blanket to said composite structure in a bonding operation.

4. Apparatus for fabricating a composite structure formed of component elements adapted to be adhesively bonded together under heat and pressure, said apparatus comprising a pair of heating platens adapted to be positioned and held with their work surfaces in opposed relationship and at opposite sides of said composite structure for transmittal of heat thereto, and means forming a pressure chamber between the work surface of one of said platens and a surface of said composite structure, said means comprising a sealing frame peripherally surrounding said composite structure, a flexible cover blanket overlying said composite structure and extending onto said sealing frame, a seal retainer member disposed above said sealing frame in continuous face to face arrangement therewith, said seal retainer member having a continuous channel therein opening in the direction of said sealing frame and a continuous sealing member of resilient material carried within said channel of said retainer member adapted for sealing engagement with said portion of said blanket overlying said sealing frame, said seal retainer member having inlet openings leading to said channel to an area above said continuous sealing member therein and having other inlet openings leading to said pressure chamber, said inlet openings adapted to lead a pressurized gaseous medium to said channel and to said pressure chamber for holding said continuous sealing member against said portion of said blanket overlying said sealing frame and for applying force through said blanket to said composite structure in a bonding operation.

5. Apparatus for fabricating a composite structure formed of component elements adapted to be adhesively bonded together under heat and pressure, said apparatus comprising a pair of heating platens adapted to be positioned and held with their work surfaces in opposed relationship and at opposite sides of said composite structure for transmittal of heat thereto, said platens each having passageways therein for flowing cylicially a fluid heating medium and a coolant fluid medium through said platen, and means forming a pressure chamber between the work surface of one of said platens and a surface of said composite structure, said means comprising a sealing frame peripherally surrounding said composite structure, a flexible cover blanket overlying said composite structure and extending onto said sealing frame, a seal retainer member disposed above said sealing frame in continuous face to face arrangement therewith, said seal retainer member having a continuous channel therein opening in the direction of said sealing frame and a continuous sealing member of resilient material carried within said channel of said retainer member adapted for sealing engagement with said portion of said blanket overlying said sealing frame, said seal retainer member having inlet openings leading to said channel to an area above said continuous sealing member therein and having other inlet openings leading to said pressure chamber, said inlet openings adapted to lead a pressurized gaseous medium to said channel and to said pressure chamber for holding said continuous sealing member against said portion of said blanket overlying said sealing frame and for applying force through said blanket to said composite structure in a bonding operation.

6. Apparatus for fabricating a composite structure formed of component elements adapted to be adhesively bonded together under heat and pressure, said apparatus comprising a pair of heating platens adapted to be positioned and held with their work surfaces in opposed relationship and at opposite sides of said composite structure for transmittal of heat thereto, said platens each comprising spaced apart top and base plates and wall members therebetween forming intercommunicating passageways for cyclical flow of a fluid heating medium and a coolant fluid medium through said platen, and means forming a pressure chamber between the work surface of one of said platens and a surface of said composite structure, said means comprising a sealing frame peripherally surrounding said composite structure, a flexible cover blanket overlying said composite structure and extending onto said sealing frame to enclose said composite structure, said sealing frame having through apertures therein to permit escape of volatile gases from the area of the enclosed composite structure, a seal retainer member disposed above said sealing frame in continuous face to face arrangement therewith, said seal retainer member having a continuous channel therein opening in the direction of said sealing frame and a continuous sealing member of resilient material carried within said channel of said retainer member adapted for sealing engagement with said portion of said blanket overlying said sealing frame, said seal retainer member having inlet openings leading to said channel to an area above said continuous sealing member therein and having other inlet openings leading to said pressure chamber, said inlet openings adapted to lead a pressurized gaseous medium to said channel and to said pressure chamber for holding said continuous sealing member against said portion of said blanket overlying said sealing frame and for applying force through said blanket to said composite structure in a bonding operation.

7. Apparatus for fabricating a composite structure formed of component elements adapted to be adhesively bonded together under heat and pressure, said apparatus comprising a pair of heating platens adapted to be positioned and held with their work surfaces in opposed relationship and at opposite sides of said composite structure for transmittal of heat thereto, and means forming a pressure chamber between the work surface of one of said platens and a surface of said composite structure, said means comprising a sealing frame peripherally surrounding said composite structure, a flexible cover blanket overlying said composite structure and extending onto said sealing frame, a seal retainer member disposed above said sealing frame in continuous face to face arrangement therewith, said seal retainer member having a continuous channel therein opening in the direction of said sealing frame and a continuous sealing member of resilient material carried within said channel of said retainer member adapted for sealing engagement with said portion of said blanket overlying said sealing frame, said continuous sealing member being generally boot-shaped in cross-section, said seal retainer member having inlet openings leading to said channel to an area above said continuous sealing member therein and having other inlet openings leading to said pressure chamber, said inlet openings adapted to lead a pressurized gaseous medium to said channel and to said pressure chamber for holding said continuous sealing member against said portion of said blanket overlying said sealing frame and for applying force through said blanket to said composite structure in a bonding operation.

8. Apparatus for fabricating a composite structure formed of component elements adapted to be adhesively bonded together under heat and pressure, said apparatus comprising a pair of heating platens adapted to be positioned and held with their work surfaces in opposed relationship and at opposite sides of said composite structure for transmittal of heat thereto, said platens each comprising spaced apart top and base plates and wall members therebetween forming passageways for circuit flow of a fluid heating medium and a coolant fluid medium cyclically through said platen, and means forming a pressure chamber between the work surface of one of said platens and a surface of said composite structure, said means comprising a sealing frame peripherally surrounding said composite structure, a flexible cover blanket overlying said composite structure and extending onto said sealing frame to enclose said composite structure, said sealing frame having through apertures therein to permit escape of volatile gases from the area of the enclosed composite structure, a seal retainer member disposed above said sealing frame in continuous face to face arrangement therewith, said seal retainer member having a continuous channel therein opening in the direction of said sealing frame and a continuous sealing member of resilient material carried within said channel of said retainer member adapted for sealing engagement with said portion of said blanket overlying said sealing frame, said continuous sealing member being generally boot-shaped in cross-section, said seal retainer member having inlet openings leading to said channel to an area above said continuous sealing member therein and having other inlet openings leading to said pressure chamber, said inlet openings adapted to lead a pressurized gaseous medium to said channel and to said pressure chamber for holding said continuous sealing member against said portion of said blanket overlying said sealing frame and for applying force through said blanket to said composite structure in a bonding operation.

References Cited in the file of this patent

UNITED STATES PATENTS

| | | |
|---|---|---|
| 280,745 | Hyatt | July 3, 1883 |
| 743,812 | Bonneau | Nov. 10, 1903 |
| 2,138,620 | Strange | Nov. 29, 1938 |
| 2,411,043 | Klassen | Nov. 12, 1946 |
| 2,575,734 | Schulman | Nov. 20, 1951 |
| 2,725,091 | Miner et al. | Nov. 29, 1955 |
| 2,783,500 | Lazarr | Mar. 5, 1957 |